United States Patent [19]

Gurth

[11] Patent Number: 4,514,139

[45] Date of Patent: Apr. 30, 1985

[54] METHOD AND APPARATUS FOR PUMPING FRAGILE ARTICLES

[76] Inventor: Max I. Gurth, 1937 Dehesa Rd., El Cajon, Calif. 92020

[21] Appl. No.: 467,457

[22] Filed: Feb. 17, 1983

Related U.S. Application Data

[63] Continuation of Ser. No. 352,160, Feb. 25, 1982, abandoned, which is a continuation of Ser. No. 166,186, Jul. 7, 1980, abandoned, which is a continuation of Ser. No. 938,224, Aug. 30, 1978, abandoned.

[51] Int. Cl.³ .............................................. F01D 1/36
[52] U.S. Cl. ...................................... 415/90; 415/206; 415/213 A; 415/DIG. 4
[58] Field of Search ................. 415/90, 213 A, 213 R, 415/206, DIG. 4

[56] References Cited

U.S. PATENT DOCUMENTS

| | | | |
|---|---|---|---|
| 2,490,066 | 12/1949 | Kollsman | 415/90 |
| 3,045,428 | 7/1962 | McLean | 415/90 |
| 3,400,883 | 9/1968 | Tramposch | 415/90 |
| 4,186,554 | 2/1980 | Possell | 415/90 |
| 4,255,081 | 3/1981 | Oklejas | 415/90 |
| 4,335,994 | 6/1982 | Gurth | 415/90 |
| 4,347,033 | 8/1982 | Possell | |

Primary Examiner—Samuel Scott
Assistant Examiner—Brian J. Bowman
Attorney, Agent, or Firm—Baker, Maxham, Callan & Jester

[57] ABSTRACT

A pump for pumping fragile articles including fish and glasses without damage includes a rotary pump having a plain disc impeller disposed in a substantially cylindrical chamber of a housing with an inlet into, or coaxial of, the impeller into the housing and an outlet from the periphery of the chamber, with the rotor arranged to provide a substantially unobstructed passage between the inlet past the rotor to the outlet of the pump. The method includes pumping fragile articles in a fluid medium by means of a disc impeller pump having an unobstructed passageway between the inlet and outlet of the pump.

4 Claims, 5 Drawing Figures

METHOD AND APPARATUS FOR PUMPING FRAGILE ARTICLES

REFERENCE TO RELATED APPLICATIONS

This application is a continuation of co-pending application Ser. No. 352,160 filed Feb. 25, 1982 (now abandon) which is a continuation of Ser. No. 166,186 filed July 7, 1980 (now abandoned) which is a continuation of Ser. No. 938,224 filed Aug. 30, 1978 (now abandoned) entitled "Method and Apparatus for Pumping Fragile Articles".

BACKGROUND OF THE INVENTION

The present invention relates to fluid pumps and pertains particularly to method and apparatus for pumping fragile articles.

Rotary disc pumps have been known for a considerable length of time. These pumps, however, have not gained widespread use because they have been unable in the past to compete effectively with positive displacement pumps and bladed impeller pumps for the pumping of fluids.

The prior art of which applicant is aware indicates that such pumps have been proposed as early as 1913, with minor improvements being made through the years until the present time. The prior art is exemplified, for example, by the following prior art patents:

U.S. Pat. No. 1,061,142, issued May 16, 1913 to N. Tesla.
U.S. Pat. No. 2,087,834, issued July 20, 1937 to Brown et al.
U.S. Pat. No. 3,487,784, issued Jan. 6, 1970 to Rafferty et al.
U.S. Pat. No. 3,644,051, issued Feb. 22, 1972 to Schapiro.
U.S. Pat. No. 4,025,225, issued May 24, 1977 to Durant.
Other patents of interest include British Specification No. 179,043, dated May 4, 1922 to N. Tesla, and
French Patent Specification No. 866,706, issued May 31, 1941 to Girodin.

These pumps are all based on the theory that the friction of the fluid on the surfaces of the plates of the rotor during rotation of the rotor develops a centrifugal force propelling the fluid out toward the periphery of the plates. These all, however, maintain and recognize the necessity for maintaining a fairly close tolerance of the spacing between the discs. There has long existed a need for systems for conveying fragile articles rapidly and conveniently without damage thereto. Fruits and vegetables, for example, are currently conveyed by means of screw-type conveyors when it is essential to convey them without a fluid medium. Prior to the present invention, there has been no known technique for conveying such articles by means of a pump in a fluid medium without damage thereto. Currently, some pumps are used to unload some fish from fishing vessels into processing tanks or the like at canneries. Such pumps, however, are of the vane type and result in a considerable amount of damage to the fish.

Vane type pumps are also used in the pumping of coal, slurry and the like. Such pumps, while effective in moving the slurry, are subject to high wear and rapid deterioration. They are also subject to clogging.

It is therefore desirable that a pump be available which is capable of rapidly and effectively conveying fragile articles by means of a fluid medium over a reasonable distance.

SUMMARY AND OBJECTS OF THE INVENTION

It is accordingly the primary object of the present invention to overcome the problems of the prior art by providing a pump capable of pumping fragile articles in a fluid medium.

Another object of the present invention is to provide an effective pump for safely and conveniently moving fragile articles in a fluid medium without damage thereto.

In accordance with the primary object of the present invention, a pump is provided for moving of fragile articles, with the pump comprising a plain disc impeller with a substantially unobstructed passage between the inlet and outlet of the pump. The fluid is pumped through the pump by means of friction and shear forces applied thereto by means of a plain disc impeller, with the fragile articles being carried along in the fluid stream without impact with portions of the pump assembly.

BRIEF DESCRIPTION OF THE DRAWINGS

The above and other objects and advantages of the present invention will become apparent from the following description when read in conjunction with the drawings, wherein:

FIG. 1 is a diagram of a typical use of the pump for moving fish or the like.

DETAILED DESCRIPTION OF A PREFERRED EMBODIMENT

Figure 1:
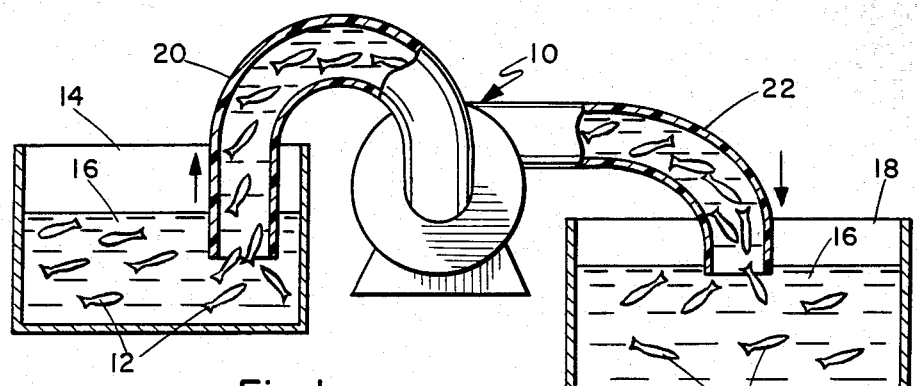

Turning now to the drawings, particularly to FIG. 1, there is illustrated a pump, designated generally by the numeral 10, pumping live fish 12 from a tank 14 in a fluid 16 such as water into a second tank 18. The second tank also contains fluid 16 such as water. The pump is provided with an inlet conduit 20 of sufficient size to convey the fish and fluid without damage to the fish into the pump 10, and therethrough and by way of an outlet conduit 22 into the second tank 18.

Figure 2:
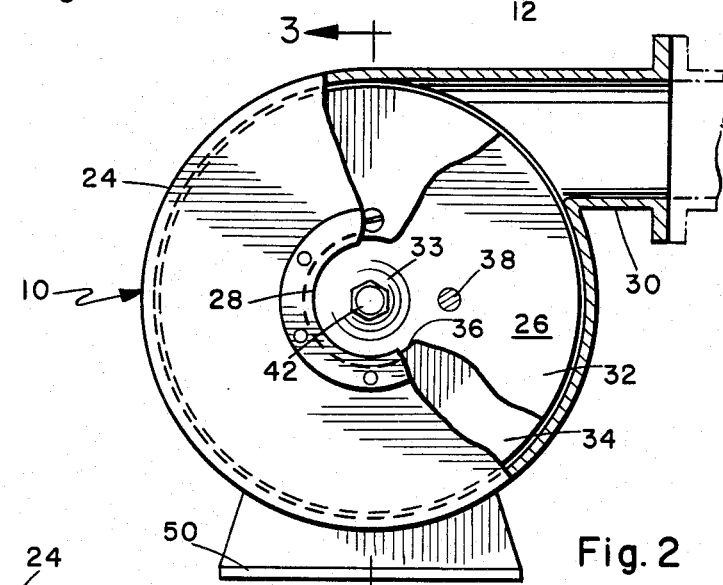
FIG. 2 is a front elevation view of the pump, with portions cut away.
Figure 3:
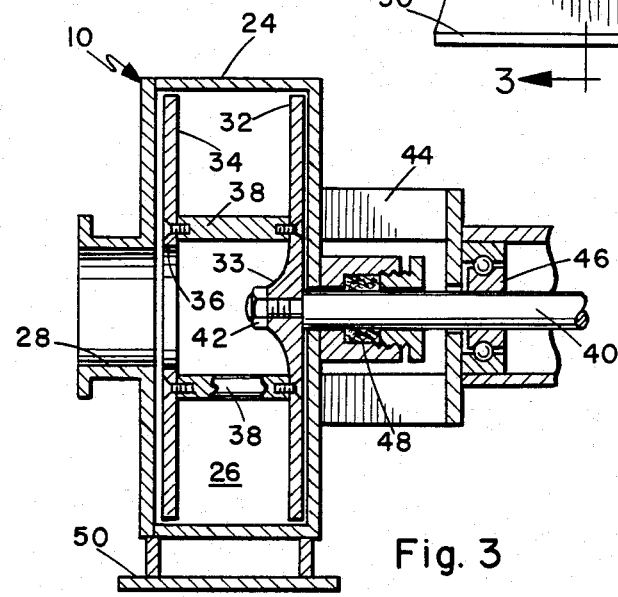
FIG. 3 is a sectional view taken on line 3—3 of FIG. 2.

As best seen in FIGS. 2 and 3, the pump 10 includes a housing 24 having a generally cylindrical chamber 26 formed by a pair of circular end walls disposed in spaced apart parallel planes and connected by a peripheral wall and in which is mounted a disc rotor. The housing includes an inlet 28 into the chamber 26 and an outlet 30 from the periphery of the chamber 26.

As best seen in FIG. 3, the pump rotor includes a first plain disc 32 having a plane impelling surface and a substantially conical-shaped streamlining portion 33 projecting toward and concentric with the inlet 28 and the axis of the chamber 26. A second plain disc 34 also of plane configuration includes a central opening 36 concentric with and substantially the same diameter of the inlet 28. The second disc 34 is connected to the inner or drive disc 32 by means of a plurality of pins 38 spaced around the axis and closely adjacent thereto. These pins are preferably as close to the central axis of the rotor as possible. This spacing is critical in the handling of fragile articles in that the movement of fluid and articles through the chamber is such that the velocity of the articles at this point is fairly low and will tend to be moving at about the same velocity and direction as the pins such that impact therewith is substantially avoided. This configuration as shown, for example, in FIGS. 2 and 3, provides an essentially unobstructed passage through the pump housing from the inlet 28 to the outlet 30. The spacing between the discs 32 and 34 should exceed the maximum dimension of the articles to be pumped in order to insure adequate spacing for unobstructed passage of an article of a predetermined size but should be no greater than the outer diameter of the discs.

Prior plain disc pumps have emphasized the necessity of close spacing between the discs in the pump. Heretofore, the spacing of such pumps, typically referred to as shear force pumps, has been considered to be fairly critical. It has always been considered necessary in the past to have a fairly close spacing between the disc in order to get the necessary shear force to propel the fluid through the pump. It has been recognized, however, in Rafferty et al. U.S. Pat. No. 3,487,784, Column 5, that the spacing can be as great as ¼ of an inch and still obtain flow of fluid therethrough. The Rafferty pump, however, is a very low pressure pump primarily for the purpose of pumping blood and does not recognize the possibility of pumping articles in a fluid, or pumping with large spacing between the discs.

Applicant has discovered that large spacing between the discs is possible and of from ½ an inch up to at least as much as a foot or more. As shown in FIGS. 2 and 3, the discs should be as large as possible to provide maximum surface area. The discs should be about as large in outer diameter as the chamber with a uniform peripheral spacing between the peripheral edge thereof and the peripheral wall of no more than ten percent of the disc diameter. The inner diameter of the disc is preferably no greater than one-half the outer diameter. Applicant has essentially discovered a pump construction and method capable of pumping highly fragile articles such as live fish and the like, from one place to another such as from one tank to another, from a fishing vessel to the processing tanks and the like.

The rotor of the pump in FIG. 3 is mounted on a suitable drive shaft 40 such as by means of a nut 42. The drive shaft is mounted in a suitable bearing support bracket 44 by means of a bearing 46 and includes suitable seal means 48 for sealing the shaft within the housing. The housing is supported on a suitable base member 50 for mounting in the usual manner.

The applicant has tested and demonstrated the safety and feasibility of the present invention by means of a prototype in which goldfish were recirculated from a tank through the pump and back to the tank for a period of approximately two hours. Several hundred goldfish were involved and no noticeable damage or side effects were noted. The day following the test, a single one of the more than 200 goldfish was found to be dead. The fish was inspected and no bruises or contusions were found on the fish.

Figure 4:
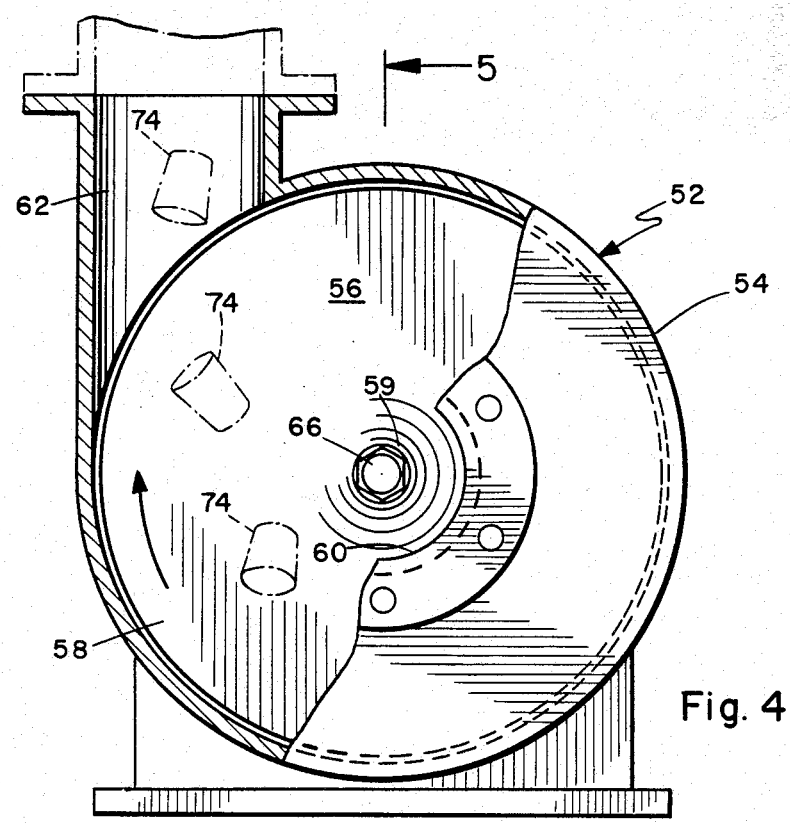
FIG. 4 is a front elevation view of an alternative form of the pump, with a portion cut away.
Figure 5:
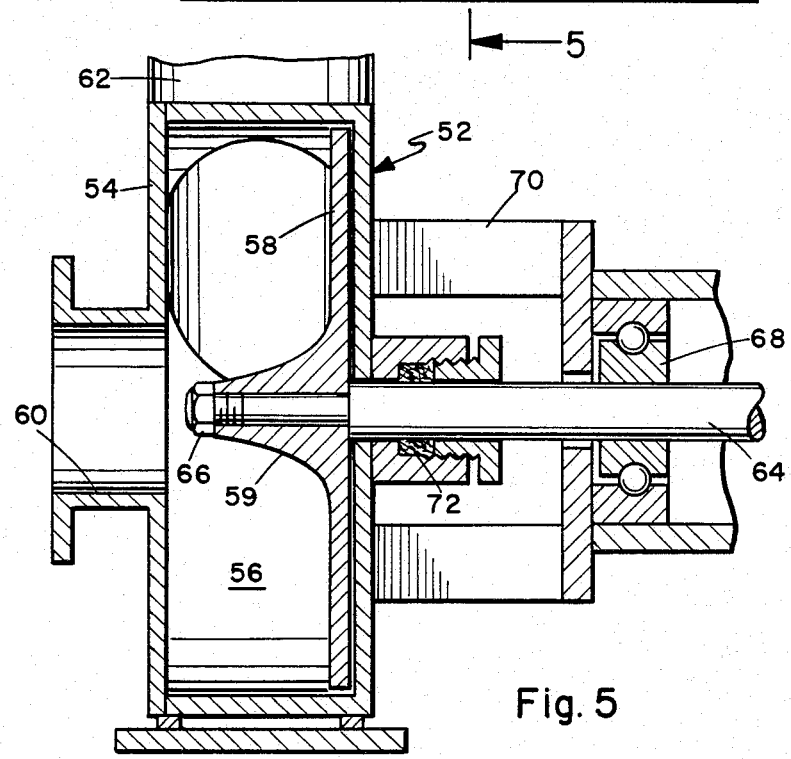
FIG. 5 is a sectional view taken on line 5—5 of FIG. 4.

An alternate embodiment of the invention is shown in FIGS. 4 and 5, wherein a pump designated generally by the numeral 52 includes a housing 54 having a substantially cylindrical inner chamber 56, in which is mounted a rotor 58 which is also a plain disc impeller having a forwardly directed, somewhat conical-shaped vortex reducing portion 59, which projects substantially the width of the impeller chamber to an inlet 60 of the housing. The housing, which is of a substantially cylindrical configuration, includes an outlet 62 which joins tangentially of the rotor housing and extends outward parallel and between the spaced apart parallel planes of the side walls of the housing intercepting the cylindrical chamber walls at 62a and 62b. The impeller or rotor 58 is mounted on a drive shaft 64 such as by means of a nut or the like 66. The shaft 64 is mounted in a suitable bearing 68 mounted in a bearing support bracket 70. Suitable seal means 72 seals the shaft against leakage from the impeller chamber.

This configuration, as shown in FIG. 4, is capable of pumping fragile articles such as glass tumblers, such as illustrated in FIG. 4, at 74. The pump in this configuration provides a substantially unobstructed passage from the inlet past the impeller 58 into the outlet. With this arrangement, the fragile articles, such as tumblers, are maintained a sufficient distance apart so as not to impact one another and thus flow with the fluid through the impeller pump chamber from the inlet to the outlet. The articles are suspended by the fluid and cushioned against impact with the pump housing. Again, it has been found that fairly large articles may be pumped in a fluid medium, such as water, in pumps of this character. It has been found that a single impeller of the disc type as shown in FIGS. 4 and 5 is capable of applying sufficient force to the fluid within the housing to propel it through the outlet thereof. Thus, any number of fragile articles and items may be pumped in the pump in accordance with the invention.

For example, any number of fruits, such as apples, oranges, lemons, grapefruits, melons, tomatoes and the like, may be pumped in a pump in accordance with the invention. The necessary steps of the invention include the selection of a rotary disc impeller pump having a substantially unobstructed passageway between the inlet and the outlet with a sufficient spacing between the plane facing of the discs of the impeller and the opposing wall or impeller disc to permit passage of articles of a predetermined size. The articles are then disposed in a suitable fluid medium such as water and communicated with the inlet of the pump, with the outlet communicating by suitable conduits with the place where it is desired to pump the articles.

Thus, it can be seen that any number of fragile articles can be pumped by the method and apparatus of the invention.

While I have described my invention by means of specific embodiments, it is to be understood that numerous changes and modifications may be made therein without departing from the spirit and scope of the invention as defined in the appended claims.

Having described my invention, I now claim:

1. A rotary disc incompressible liquid pump for pumping an incompressible liquid medium, said pump comprising in combination:

a housing having a pair of circular end walls disposed in spaced apart parallel planes and connected together by a peripheral wall defining a rotor chamber having a constant radius at any selected plane parallel to and between said parallel planes;

one of said end walls having means defining an inlet opening co-axially of said chamber;

said peripheral wall having tubular means defining an outlet communicating with said rotor chamber and extending outwardly from said housing in a direction parallel to and between said parallel planes at a tangent to the housing walls at the outer diameter of said chamber;

an impeller shaft rotatably mounted in the other of said end walls and terminating with an inner end in said rotor chamber adjacent said other end wall;

a rotary disc impeller co-axially mounted on said inner end of said impeller shaft in said chamber for rotation therein and comprising a plurality of circular co-axially disposed discs spaced a predetermined distance apart and each disc having a pair of oppositely disposed parallel continuous planar faces and an outer diameter defined by a peripheral edge that is a uniform distance no greater than ten percent of the diameter of said discs from said peripheral wall of said chamber, one of said discs mounted directly on the end of said impeller shaft, another of said plurality of discs having a co-axial circular opening therein defining an inner diameter no greater than one-half said outer diameter and connected by a plurality of spacer pins to said one of said discs at the edge of said circular opening; and said predetermined distance said discs being spaced apart being no greater than the outer diameter of said discs sufficient to permit the unobstructed passage of articles of a predetermined size having no dimension greater than said predetermined distance in liquid from said inlet through said co-axial circular opening and between said discs to the outlet.

2. The pump of claim 1 wherein at least a plurality of said discs include a central circular opening co-axially thereof defining an inner diameter;

said plurality of discs are connected together by a plurality of spacer pins closely adjacent the edge of said inner diameter at the edge of said circular opening, and said discs are spaced at least one-fourth inch apart for providing passage for fluid borne articles through said chamber from said inlet to said outlet.

3. The pump of claim 2 wherein said spacing between said discs is greater than one-half inch.

4. The pump of claim 2 wherein the spacing between said discs is greater than six inches.

* * * * *